(12) United States Patent
Clemens

(10) Patent No.: US 7,221,866 B2
(45) Date of Patent: May 22, 2007

(54) METHODS FOR CREATING SPHERICAL IMAGERY

(75) Inventor: Clint Clemens, Tiverton, RI (US)

(73) Assignee: CGI Group AG (CH)

( * ) Notice: Subject to any disclaimer, the term of this patent is extended or adjusted under 35 U.S.C. 154(b) by 0 days.

(21) Appl. No.: 11/407,367

(22) Filed: Apr. 19, 2006

(65) Prior Publication Data

US 2007/0019946 A1    Jan. 25, 2007

Related U.S. Application Data

(60) Provisional application No. 60/700,701, filed on Jul. 19, 2005.

(51) Int. Cl.
*G03B 41/00*    (2006.01)
*H04N 5/225*    (2006.01)

(52) U.S. Cl. ................ 396/322; 348/207.1; 348/218.1

(58) Field of Classification Search ............. 348/50, 348/207.1, 218.1, 231.3, 231.6, 239, 207.99; 396/322
See application file for complete search history.

(56) References Cited

U.S. PATENT DOCUMENTS

2003/0117488 A1* 6/2003 Pierce et al. ............... 348/48

* cited by examiner

*Primary Examiner*—W. B. Perkey
*Assistant Examiner*—Rishi Suthar
(74) *Attorney, Agent, or Firm*—Brian L. Michaelis; Brown Rudnick Berlack Israels LLP

(57) ABSTRACT

High Dynamic Range (HDR) spherical images can be obtained without a requirement for special purpose cameras having linear optical sensors. Various examples of the present invention can use a standard single lens reflex (SLR) camera with a fisheye lens to obtain spherical images. The camera is positioned to obtain a plurality of images at different exposures with the camera facing up and again with the camera facing down. The images may then be processed to obtain an HDR spherical image. A center post of a tripod, an offset arm and a rotational mount may be used to position the camera. The offset arm and rotational mount can enable the camera to be oriented straight up or straight down along an optical axis separated from the center post of the tripod.

12 Claims, 4 Drawing Sheets

METHODS FOR CREATING SPHERICAL IMAGERY

REFERENCE TO RELATED APPLICATIONS

This application claims priority to and the benefit of U.S. provisional patent application Ser. No. 60/700,701, filed on Jul. 19, 2005 and entitled System and Method of Creating Spherical Imagery from a Non-Rotating Camera, incorporated herein in its entirety by reference.

BACKGROUND

Traditionally, when photographing a reflective object, such as a car, in a real environment, like a park or on a mountain or inside a building, a photographer takes a picture of the car with the background behind. All of the reflections in the surfaces, e.g. sheet metal and chrome and glass, are naturally gathered by the real vehicle.

If a photographer photographs a background image with the intent of rendering a computer generated image (CGI), for example of the car, into the scene, then the entire reflection and luminance data of the scene at the time of taking the background picture is typically gathered. To understand the problem, think of a car as a mirror with all of its surfaces reflecting the environment. Some surfaces are chrome, mirror like, others show the environment reflected in the color of the paint.

In creating spherical imagery of automobiles spherical (360×180 degree) high dynamic range (HDR) imagery is used as reflection and luminance data when rendering an automotive wire frame to create a photographic representation of that wire frame vehicle. The HDR imagery is a ball-like picture, a sphere, that contains the reflections of the scene, e.g. what is reflected onto the car paint, as well as the luminance of the scene. The luminance of the scene can then be used to "light" the CGI paint and chrome and glass, e.g. shaders, to match the exact light color of the environment.

This HDR spherical image is then wrapped around a wire frame computer model of a car in a 3D program such as 3Dmax, available from Autodesk, Inc. of San Rafael, Calif. or Maya, available from Alias Research of Toronto, Canada. When texture shaders are applied to the wire frame to represent chrome and glass and metal, they react to the HDR spherical image to create a rendering of the vehicle that looks natural and is reflecting the environment to match the background image.

Traditional approaches to obtaining HDR spherical images have involved linear optical sensors that rotate about a vertical axis. Examples of such "spherical cameras" include the Panoscan MK-3 from Panoscan, Inc. of Van Nuys, Calif. and the SpheroCam HDR from SpheronVR AG. of Waldfischbach-Burgalben, Germany. They both use fish-eye 180 degree lenses on a horizontally rotating camera to create the 360 degree image of the environment. The Panoscan achieves HDR by rotating three times to make the layers necessary for HDR. The SpheroCam HDR uses several successive exposures from a single scan line in a chip, before rotating to the next minute scan position.

The costs of these cameras are high, creating a serious barrier to entry for a photographer into many fields, including the field of CGI automotive background photography. Both cameras require attachment to computers and are too delicate or time consuming to set-up for work in the demanding area of location car photography.

SUMMARY

Various embodiments of the present invention address a need in the art for obtaining HDR spherical images without need for special purpose cameras having rotating optical sensors. Examples of the present invention can use a standard single lens reflex (SLR) camera with a fisheye lens to obtain HDR spherical images. The camera is positioned to obtain a plurality of images at different exposures with the camera facing up and again with the camera facing down. The images are then processed to obtain an HDR spherical image.

According to one embodiment of a method according to the invention, a method of creating spherical imagery from a camera is provided including taking at least one image with the camera facing up to form an up image. A height of a center post of a tripod or stand is adjusted. At least one image is taken with the camera facing down to form a down image. The images are transformed into flattened equirectangular images, and the up image and the down image are combined to form a final spherical image. The method may also be in the form of a computer readable medium containing instructions for the method.

According to another embodiment, a method of creating an image is provided. The method includes combining a first plurality of images from a camera facing up to form an up image. At least some of the images of the first plurality of images are taken at different exposures. A second plurality of images from a camera facing down are combined to form a down image. At least some of the images of the second plurality of images are also taken at different exposures. The up image and the down image are combined to form a spherical image.

According to a further embodiment, a method of creating reflective imagery on a reflective object is provided. This method includes obtaining a high dynamic range image with the camera facing up to form a high dynamic range up image and obtaining a high dynamic range image with the camera facing down to form a high dynamic range down image. The high dynamic range up image and the high dynamic range down image are combined to form a high dynamic range spherical image. The reflective object is rendered using the reflection and luminance data from the high dynamic range up image, the high dynamic range down image and/or the high dynamic range spherical image.

BRIEF DESCRIPTION OF THE DRAWINGS

The invention will be apparent from the description herein and the accompanying drawings, in which like reference characters refer to the same parts throughout the different views.

DETAILED DESCRIPTION

By obtaining reflectance and luminance data of the scene of a background image, a wire frame image can be rendered to appear natural in the background image. While the invention is applicable to a wide range of fields, use of the reflectance and luminance data can be particularly beneficial when the wire frame image corresponds to an image that has reflective surfaces, such as a vehicle.

High dynamic range (HDR) reflectance and luminance data is often desired to properly render the wire frame image. Dynamic range relates to the amount of detail in the deepest shadows to the brightest highlights. A typical high-end digital camera can only capture about 12 f/stops of dynamic range. Shadow and highlight detail beyond 12 f/stops of the correct exposure is lost as either black or white. To create an HDR image for rendering a reflective object, such as an automobile, at least 26 f/stops of dynamic range may be required.

According to an embodiment of the invention, in order to create an HDR image using existing low dynamic range cameras, several successive images of a scene can be taken at different exposures and then layered, like sheets of paper, to create a stack of papers (images) that together are HDR. In one example, the series of images, or sheets of papers, are 2 stops apart. The darkest exposures will look almost all black but will show detail in the highlights of a scene, like a light bulb. When all the images are compiled together in registration then the resulting image is an HDR image of that scene.

The above paragraph describes a flat HDR image. Two problems that can arise when creating a spherical HDR image are: layer registration and 360 rotation. Because computer camera chips are flat planes, expensive, horizontally rotating cameras with linear optical sensors have traditionally been the solution for creating 360×180 imagery.

Figure 1:
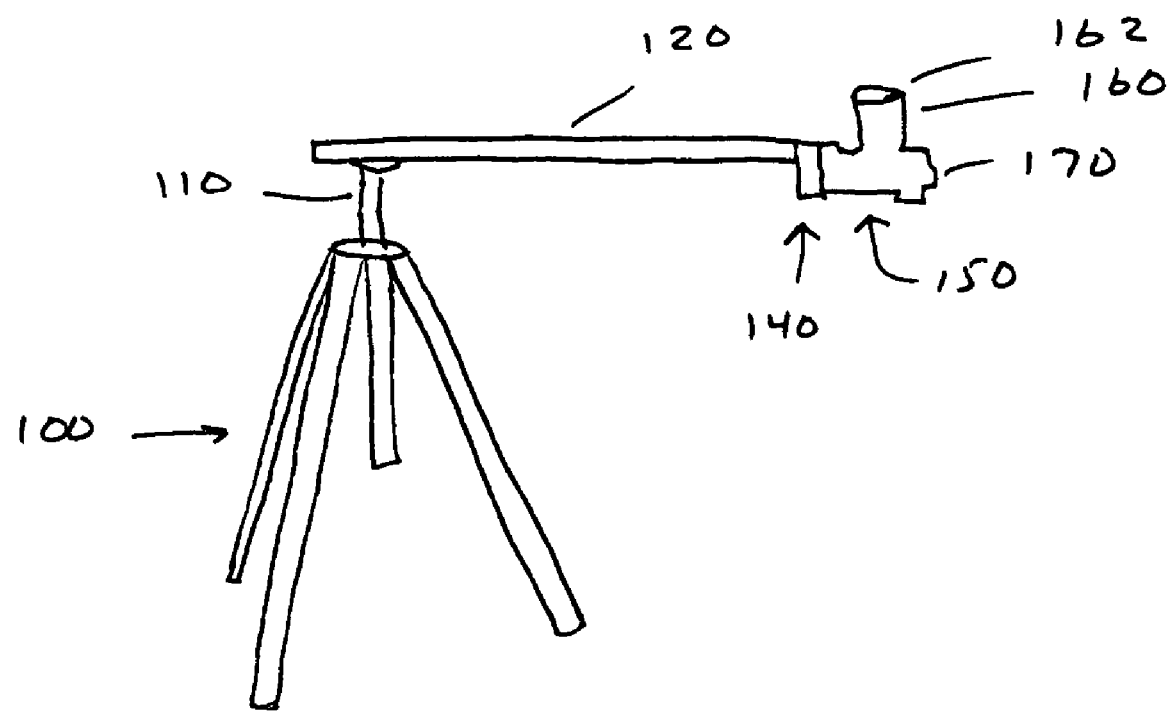
FIG. 1 is a perspective view of an apparatus having a camera facing up for obtaining spherical images according to an implementation of an embodiment of the invention.

According to an illustrative embodiment of the invention, a conventional camera having a fish eye lens along with a tripod having an adjustable center post, an offset arm and a rotational mount may be used to obtain HDR reflectance and luminance data. According to this illustrative embodiment, there is no need for a traditional, expensive horizontally rotating, linear optical sensor camera for taking 360×180 imagery. With reference to FIG. 1, a tripod 100 serves as a support stand and includes a vertically adjustable center post 110. The adjustable center post 110 is vertically adjustable relative to the base of the tripod 100. An offset horizontal arm 120 with a rotational mount 140, such as a 90 degree mounting plate, is mounted to the adjustable center post 110. Other alternative configuration of a stand apparatus useful in the context of the method according to the invention are described in U.S. patent application Ser. No. 11/407,308, entitled Stand Apparatus for Photographic Uses, filed Apr. 19, 2006, and incorporated by reference herein in its entirety.

FIG. 1 illustrates a camera 150 with a fish eye lens 160. While a wide variety of cameras and lenses may be used, the examples in the illustrative embodiment are the Canon EOS 1Dx Mark II digital camera, available from Canon USA, Inc. of Lake Success, N.Y. and the Sigma 15 mm f2.8 EX Diagonal Fisheye Auto-Focus Lens available from Sigma Corporation of America of Ronkonkoma, N.Y. The camera may also optionally be equipped with a level 170, such as the Bogen—Manfrotto Hot Shoe 2 Axis Bubble Level, part number BG 337, available from the Manfrotto Group of Bassano del Grappa (VI), Italy.

Figure 2:
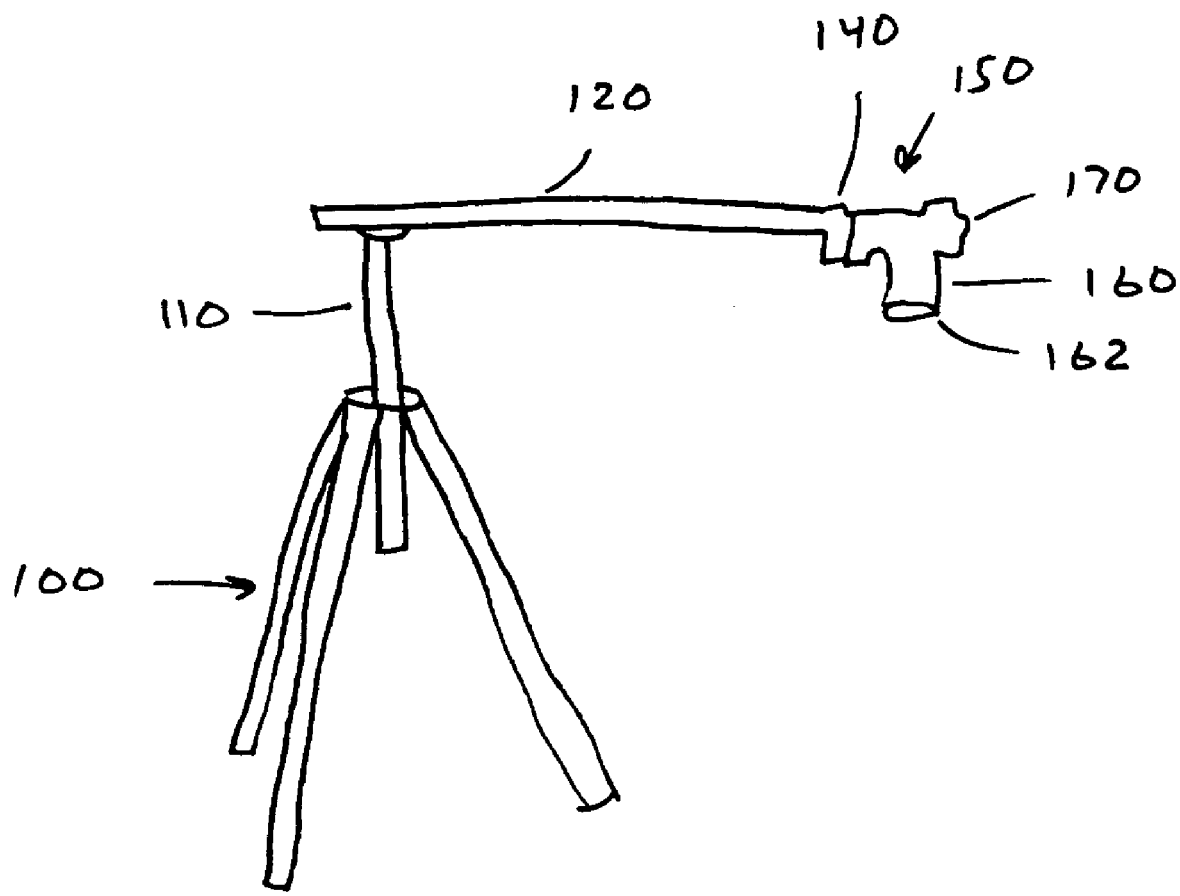
FIG. 2 is a perspective view of the apparatus of FIG. 1 with the camera facing down.

In FIG. 1, the camera 150 is pointing upward, with the lens 160 oriented to take an upward hemispherical image. A distal end 162 of the lens 160 is located in an optical plane. FIG. 2 illustrates a configuration enabling downward hemispherical images. The center post 110 of the tripod 110 is raised to elevate the offset arm 120, rotational mount 140 and camera 150. The rotational mount 140 is rotated to orient the camera 150 downward. The center post 110 is raised sufficiently to locate the distal end 162 of the lens 160 in the same optical plane it was located in when facing upward. By locating the distal end 162 of the lens 160 in the same optical plane, the nodal point of the lens stays the same when the camera inverts and the upward hemispherical images and downward hemispherical images will correspond to each other. In one example, the seam between the upward and downward hemispherical images will be at the horizon. While some lack of precision may be accommodated in locating the distal end 162 of the lens, by locating the distal end 162 within the same optical plane, later combination of the upward and downward hemispherical images is aided by precise location of the lens 160. The horizon is the only area of a hemispherical image that may not be distorted, so therefore it can be retouched together with the seam of the opposing group of hemispherical images.

Figure 3:
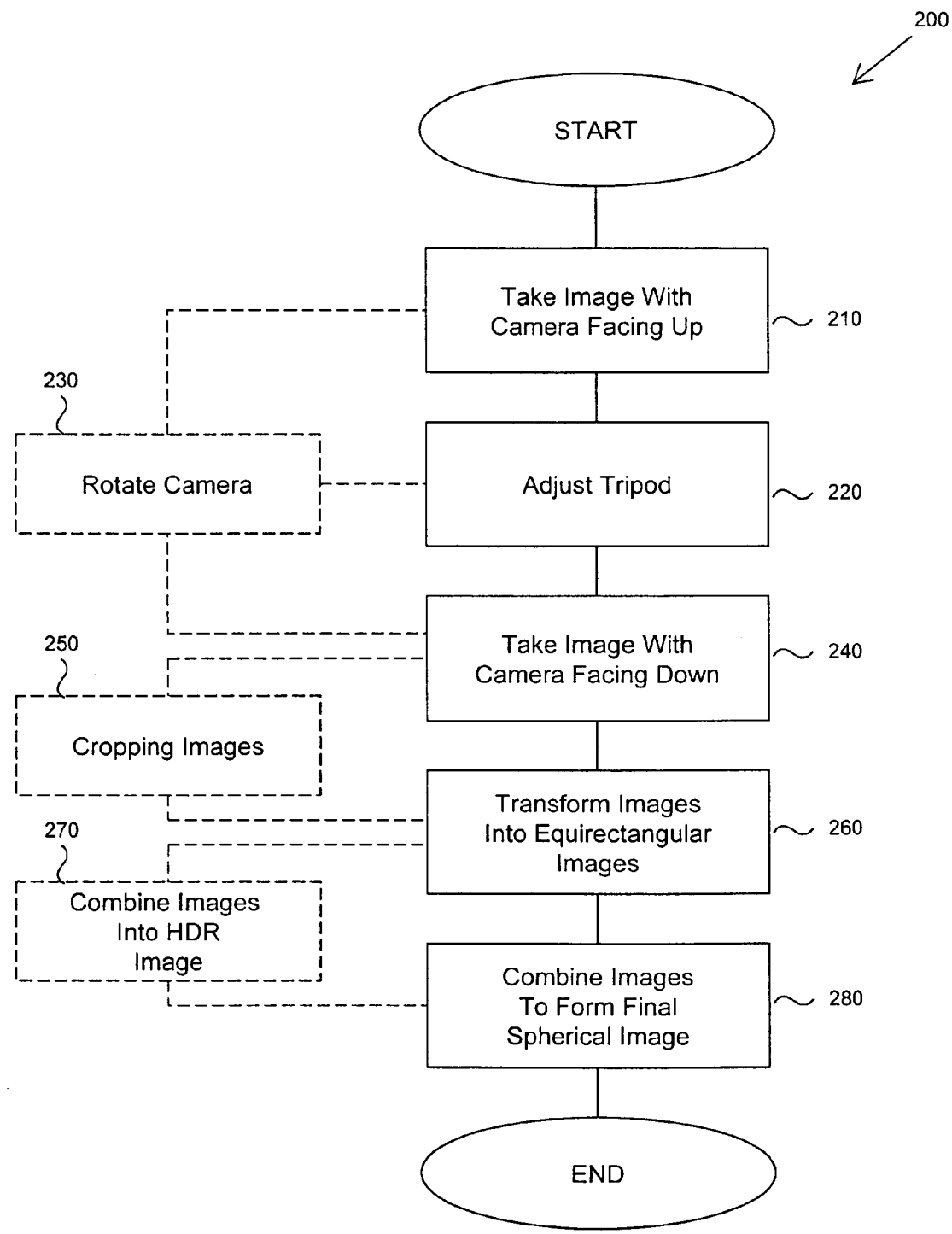
FIG. 3 is an illustration of a method according to an illustrative embodiment of the invention.

A method 200 is illustrated in FIG. 3 with reference to an illustrative embodiment of the invention. One or more images are taken 210 with the camera facing up. If a plurality of images are taken, enough images may be taken to cover 26 f/stops of dynamic range. In one example, six images are taken with the camera facing up. The tripod is then adjusted 220, such as by raising the center post of the tripod. The camera may also be rotated 230. With the camera facing down, one or more images are taken 240. Similar to when the camera was facing up, if a plurality of images are taken, enough images may be taken to cover 26 f/stops of dynamic range, which, in one example, is six images. As used herein, the term "obtaining" an image is intended to include the taking of an image using a camera and/or receiving an image that was taken by a camera, including processed versions of such an image.

The images taken with the camera facing up and the images taken with the camera facing down may optionally be uniformly cropped 250. Each group of images should be cropped identically to the other images in the group. In one example, a software program like PTMac, available from Kekus Digital is used to crop the first image by eliminating all of the black area around the circular fish eye. Each image may be replaced in succession with a new file image and then cropped using the exact same crop position in the software. In this example, the crop tool is not moved until cropping the second group of images. The result is a plurality of images up and a plurality of images down with the same crop within their respective groups.

The images are then transformed 260 into equirectangular images. In one example, the images are transformed into flattened equirectangular images through a program such as Photomatix, available from MultimediaPhoto SARL of Montpellier, France. The images may optionally be combined 270 to form HDR images, one HDR image corresponding to the group of images taken with the camera facing up and another HDR image corresponding to the group of images taken with the camera facing down. The images are then combined to assemble the flattened images in order and with identification for exposure settings. Examples of programs for effecting the combination include Photomatix or HDRShop. HDRShop is available from the University of Southern California Office of Technology Licensing.

An image corresponding to the camera facing up and an image corresponding to the camera facing down are then combined 280 to form a final spherical image having the desired luminance and reflectance information. The two equirectangular images are put into one image document and retouched at the equator. By way of example, Adobe Photoshop CS2 available from Adobe Systems Incorporated of San Jose, Calif. may be used and will retain the image document as an HDR image while retouching. This final spherical image, preferably an HDR image, is then ready for rendering wire frame automotive images.

Figure 4:
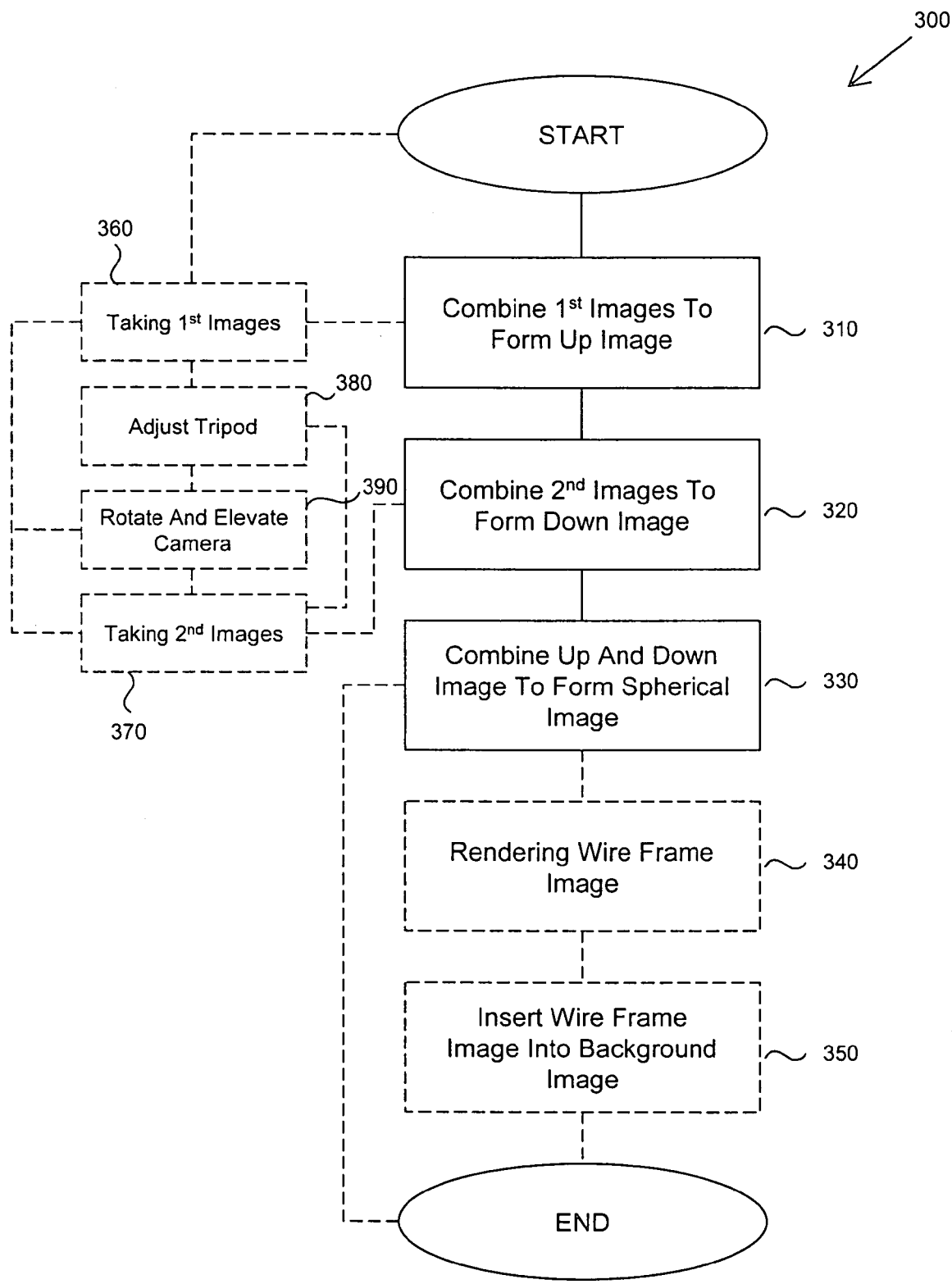
FIG. 4 is an illustration of another method according to an illustrative embodiment of the invention.

Another illustrative embodiment of the invention is the method 300 of FIG. 4. The method includes combining 310 a first plurality of images from a camera facing up to form an up image. At least some of the images of the first plurality of images are taken at different exposures. A second plurality of images from a camera facing down are combined 320 to form a down image. At least some of the images of the second plurality of images are also taken at different exposures. The up image and the down image are combined 330 to form a spherical image. The method optionally also includes rendering 340 a wire frame image. The rendering will likely form at least one reflection in the image based on luminance and reflectance data in the spherical image. The method may further optionally include inserting 350 the wire frame image into a background image. The background image is of a background of an environment corresponding to the first plurality of images and the second plurality of images.

The illustrative method 300 of FIG. 4 may also optionally include taking 360 the first plurality of images and/or taking 370 the second plurality of images. In an illustrative example of implementing an embodiment of the invention, matrix metering is used, with focus set to manual on infinity. The extra precaution of taping the focus ring to prevent focus changes may be taken. Auto bracketing is set to +2, 0, −2 stop bracket. The sequence is set to: over, on, under. For an outdoor scene, white balance can be set to 5400K so that sunset colors are correct. Other environments may benefit from tungsten or fluorescent white balance settings if appropriate. However, in the illustrative example of the invention, the white balance is prevented from changing, such as by manually selecting a color temperature. A cable release may be used for all exposures.

Use of an uncompressed file format, such as Camera Raw format, may be used for digital image file format. Other formats may be used, but may introduce undesirable effects inherent with other formats, such as compression artifacts and loss of image detail and/or data inherent with jpeg or other compressed formats. Optional use of only one Compact Flash ("CF") card, as known in the art, for each scene may be beneficial to organizing later workflow. In one example, shoot the up images and down images first, then, using the same CF card, shoot the background plates using the camera with whatever lens is suitable for the background image. Then change the card every time when shooting a new group of background and up/down images. In one example, 1 GB Lexar CF cards, available from Lexar Media, Inc. of Fremont, Calif., are used.

According to the illustrative example, a tripod is adjusted, so that the top of the tripod is level and the center post of the tripod is oriented vertically. The camera is aimed perpendicular to the strongest light and so that half ground and half sky is in frame, e.g. the horizon runs horizontally through the image. The exposure settings of the camera are manually adjusted so that the correct exposure is 0. The camera, if not already mounted to the tripod, is now mounted to the tripod. In one example, the camera is mounted to the tripod by the use of an offset arm and rotational mount as illustrated and described with respect to FIGS. 1 and 2.

The tripod and offset arm are positioned so that the offset arm points toward the background camera shooting position. The tripod is configured to not move when changing the camera from up to down positions. If the tripod does move, the up/down sequence may be started over.

With the camera facing upward, the photographer may lie on the ground and shoot a plurality of images. In one example, a sequence of 6 frames are taken +2, 0, −2, −4, −6 and −8 stops apart. By bracketing by shutter speed and not aperture, focus is unchanged, resulting in more consistent images and better resulting HDR image. Bracketing may also be accomplished by aperture, but this will change focus. In the present example, the sequence of frames may be taken in a particular order to aid in efficiency of workflow, although the frames may be taken in any order.

Continuing with the illustrative example, upon completion of taking the sequence of images with the camera facing upward, a tripod is adjusted 380, such as by the height of a center post of the tripod adjusted upward and the camera rotated and elevated 390 to orient the camera facing downward. This may be done by the use of a center post of a tripod, an offset arm and a rotational mount. In this case, the offset arm and rotational mount couple the camera to the center post and enable the camera to be oriented straight up or straight down along an optical axis separated from the center post of the tripod. The center post is raised sufficiently to locate the distal end of the lens in the same optical plane it was located in, keeping the nodal point of the lens in the same location, when facing upward.

With the camera facing downward, the photographer may stand behind the tripod and shoot a plurality of images, such as, for example, a sequence of 6 frames. In this example, the image are taken +2, 0, −2, −4, −6 and −8 stops apart, as described above in relation to the procedure for shooting images with the camera facing upward.

By the use of the offset arm or similar device, the optical axis of the camera is off set from the tripod. When shooting straight down, the camera sees what is directly under it. Since the spherical luminance and reflectance data is used for reflection plates in object rendering, such as automotive rendering, the appearance of the offset tripod in the lower hemisphere is acceptable, as the tripod supporting the camera is at a location in a field of view in which an object is to be inserted in the spherical image. By way of explanation, if the real world camera is the center of the reflection spherical image, then that image is wrapped around the wire frame of the object, e.g. vehicle, as if the camera were centered in the wire frame. If the orientation of the reflected image is correctly aligned to a background image, then the tripod is reflecting on the backside of the vehicle, which is never seen. Furthermore, if a tripod of a fixed leg length is used, the wire frame of the vehicle can be properly scaled to the scene by using the tripod as a measuring device for the wire frame. This saves time in scaling the vehicle and its shape and distortion to match the background image lens and distortion. In one example, the tripod height is approximately 28 inches. It is understood that a variety of alternative tripods/camera supports within the scope of the invention may be envisioned by one of ordinary skill in the art upon review of this specification.

The methods according to the invention may be contained on a computer readable medium according to a further embodiment of the invention. The computer readable medium may be a wide variety of mediums known in the art for temporarily or permanently having instructions for performing a method. Examples of such media include machine-readable storage devices, such as optical disks and magnetic disks, and computer chips, such as memory chips or USB memory sticks or flash drives. Instructions to perform one or more methods according to the present invention may be stored in or located on the computer readable medium.

The illustrative embodiments, implementations and examples herein are meant to be illustrative and not limiting. The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way.

What is claimed is:

1. A method of creating an image, comprising:
    combining a first plurality of images from a camera facing up to form an up image, at least some of the images of the first plurality of images taken at different exposures;
    combining a second plurality of images from a camera facing down to form a down image, at least some of the images of the second plurality of images taken at different exposures; and
    combining the up image and the down image to form a spherical image.

2. The method of claim 1, further comprising rendering a wire frame image, forming at least one reflection in the image based on the spherical image.

3. The method of claim 2, further comprising inserting the wire frame image into a background image of a background of an environment corresponding to the first plurality of images and the second plurality of images.

4. The method of claim 2, wherein in the rendering step, the wire frame image corresponds to a vehicle.

5. The method of claim 1, wherein the step of combining a first plurality of images from a camera facing up comprises:
    uniformly cropping each image of the first plurality of images; and
    transforming each image of the first plurality of images into a flattened equirectangular image;
    wherein the up image has a higher dynamic range corresponding to the different exposures of the first plurality of images.

6. The method of claim 5, wherein the step of combining a second plurality of images from a camera facing down comprises:
    uniformly cropping each image of the second plurality of images; and
    transforming each image of the second plurality of images into a flattened equirectangular image;
    wherein the down image has a higher dynamic range corresponding to the different exposures of the second plurality of images.

7. The method of claim 1, wherein the combining step comprises retouching an equator, the equator corresponding to a horizon in the first plurality of images and the second plurality of images.

8. The method of claim 1, further comprising:
    taking the first plurality of images; and
    taking the second plurality of images.

9. The method of claim 8, further comprising, between the step of taking the first plurality of images and the step of taking the second plurality of images, the step of adjusting a height of a center post of a tripod upon which the camera is mounted.

10. The method of claim 8, further comprising, between the step of taking the first plurality of images and the step of taking the second plurality of images, the step of rotating and elevating the camera.

11. The method of claim 10, wherein the step of rotating and elevating the camera is performed by the use of a center post of a tripod, an offset arm and a rotational mount, the offset arm and rotational mount coupling the camera to the center post and enabling the camera to be oriented straight up or straight down along an optical axis separated from the center post of the tripod.

12. The method of claim 8, wherein the step of taking the second plurality of images comprises having a support stand for the camera in a field of view at a location in which an object is to be inserted in the spherical image.

* * * * *